(12) United States Patent
Won et al.

(10) Patent No.: US 10,944,995 B2
(45) Date of Patent: Mar. 9, 2021

(54) ENCODING APPARATUS, DECODING APPARATUS, AND CONTROL METHODS THEREFOR

(71) Applicant: Samsung Electronics Co., Ltd., Suwon-si (KR)

(72) Inventors: Kwang-hyun Won, Bucheon-si (KR); Jae-sung Lee, Seoul (KR); Won-hee Choe, Seoul (KR); Soon-gi Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/093,881

(22) PCT Filed: Apr. 17, 2017

(86) PCT No.: PCT/KR2017/004103
§ 371 (c)(1),
(2) Date: Oct. 15, 2018

(87) PCT Pub. No.: WO2017/179960
PCT Pub. Date: Oct. 19, 2017

(65) Prior Publication Data
US 2019/0089987 A1 Mar. 21, 2019

(30) Foreign Application Priority Data
Apr. 15, 2016 (KR) .................. 10-2016-0046271

(51) Int. Cl.
*H04N 19/82* (2014.01)
*H04N 19/59* (2014.01)
(Continued)

(52) U.S. Cl.
CPC .......... *H04N 19/82* (2014.11); *H04N 19/117* (2014.11); *H04N 19/147* (2014.11);
(Continued)

(58) Field of Classification Search
CPC ...... H04N 19/82; H04N 19/147; H04N 19/86; H04N 19/46; H04N 19/117; H04N 19/176;
(Continued)

(56) References Cited

U.S. PATENT DOCUMENTS 6,301,301 B1  10/2001  Isu et al.
8,660,174 B2  2/2014  Fu et al.
(Continued)

FOREIGN PATENT DOCUMENTS

JP    11-55672 A    2/1999
JP    2000-023168 A    1/2000
(Continued)

*Primary Examiner* — Tat C Chio
(74) *Attorney, Agent, or Firm* — Jefferson IP Law, LLP

(57) ABSTRACT

A decoding apparatus is provided. The decoding apparatus includes a communication unit for receiving multiple encoding data respectively corresponding to multiple areas constituting one image, and reference data including attribute information of each of the multiple areas, and a processor for generating multiple divided images by decoding the multiple encoding data respectively, changing the resolutions of some divided images among the multiple divided images on the basis of the received attribute information, and generating a reconstructed image by merging the some divided images having the changed resolutions and the remaining divided images.

13 Claims, 9 Drawing Sheets

(51) Int. Cl.
*H04N 21/236* (2011.01)
*H04N 21/2343* (2011.01)
*H04N 21/2662* (2011.01)
*H04N 21/43* (2011.01)
*H04N 19/19* (2014.01)
*H04N 19/176* (2014.01)
*H04N 19/117* (2014.01)
*H04N 19/46* (2014.01)
*H04N 19/86* (2014.01)
*H04N 19/147* (2014.01)
*H04N 19/182* (2014.01)
*H04N 19/597* (2014.01)

(52) U.S. Cl.
CPC ......... *H04N 19/176* (2014.11); *H04N 19/182* (2014.11); *H04N 19/19* (2014.11); *H04N 19/46* (2014.11); *H04N 19/59* (2014.11); *H04N 19/597* (2014.11); *H04N 19/86* (2014.11); *H04N 21/236* (2013.01); *H04N 21/2343* (2013.01); *H04N 21/2662* (2013.01); *H04N 21/43* (2013.01)

(58) Field of Classification Search
CPC .... H04N 19/19; H04N 21/43; H04N 21/2662; H04N 21/2343; H04N 21/236; H04N 19/597; H04N 19/182; H04N 19/59; H04N 21/440245; H04N 21/440263
See application file for complete search history.

(56) References Cited

U.S. PATENT DOCUMENTS

| | | |
|---|---|---|
| 2011/0305274 A1 | 12/2011 | Fu et al. |
| 2012/0294369 A1* | 11/2012 | Bhagavathy ......... H04N 19/119 375/240.16 |
| 2014/0177706 A1* | 6/2014 | Fernandes ........... H04N 19/463 375/240.03 |
| 2015/0156557 A1 | 6/2015 | Kang et al. |
| 2016/0165246 A1* | 6/2016 | Nagumo ............. H04N 19/117 375/240.25 |

FOREIGN PATENT DOCUMENTS

| | | |
|---|---|---|
| JP | 2012-175527 A | 9/2012 |
| JP | 5436371 B2 | 3/2014 |
| KR | 10-1433501 B1 | 8/2014 |
| KR | 10-2015-0018575 A | 2/2015 |
| KR | 10-2015-0065069 A | 6/2015 |
| KR | 10-2015-0133414 A | 11/2015 |
| WO | 2013/171183 A1 | 11/2013 |
| WO | 2015/088125 A1 | 6/2015 |

* cited by examiner

ENCODING APPARATUS, DECODING APPARATUS, AND CONTROL METHODS THEREFOR

TECHNICAL FIELD

The disclosure relates to an encoding apparatus, a decoding apparatus, and control methods therefor. More particularly, the disclosure relates to an encoding apparatus that changes an image on the basis of an attribute of an area in an image, a decoding apparatus, and control methods therefor.

DESCRIPTION OF RELATED ART

The advancement of electronic technology has introduced apparatuses that perform a function of reproducing streaming data. The streaming data generally refers to a form of data which is capable of being reproduced simultaneously with a multimedia content received in a broadcast environment using a wired/wireless network rather than storage media such as a compact disc (CD) or a hard disk drive (HDD).

As a service related to providing streaming data, a video on demand (VOD) service has become popular and significant in the fields of digital television (DTV) of A/V player products. The VOD service is a customized image information service for providing data that a user needs at a desired time by receiving streaming data from a VOD service provider.

In recent years, a service for transmitting streaming data by adjusting a resolution of an image according to a network speed has been introduced. However, in a case where a resolution of an image is adjusted and the image having the changed resolution is transmitted, there is a case where a screen displayed on a display on the receiving side is abnormally output.

DETAILED DESCRIPTION

Technical Problem

Aspects of the disclosure are to address at least the above-mentioned problems and/or disadvantages and to provide at least the advantages described below. Accordingly, an aspect of the disclosure is to provide an encoding apparatus for changing an image based on attribute of an area in an image, a decoding apparatus, and control methods of the encoding apparatus and the decoding apparatus.

Solution to Problem

In accordance with an aspect of the disclosure, a decoding apparatus is provided. The decoding apparatus includes a communication interface configured to receive multiple encoding data respectively corresponding to multiple areas constituting one image, and reference data including attribute information of each of the multiple areas, and a processor configured to generate multiple divided images by decoding the multiple encoding data, to change resolutions of some divided images among the multiple divided images on the basis of the received attribute information, and to generate a reconstructed image by merging the some divided images having the changed resolutions and the remaining divided images.

The processor may be configured to upscale the resolutions of the some divided images.

The communication interface may be configured to receive filter information. The processor may be configured to generate the reconstructed image by applying a filter corresponding to the received filter information to the some divided images and merging the some divided images to which the filter is applied and the remaining divided images.

The processor may be configured to, based on the filter information being encoded and received, decode the encoded filter information.

The processor may be configured to perform an image process for the generated reconstructed image.

The image process may be at least one of deblocking filtering and adjustment of pixel values of a boundary between merged images.

The decoding apparatus may further include a display configured to display the generated reconstructed image.

The processor may be configured to control the communication interface to transmit the generated reconstructed image to an external apparatus.

In accordance with another aspect of the disclosure, an encoding apparatus is provided. The encoding apparatus includes a processor configured to divide an image into multiple areas, and to generate multiple encoding data respectively corresponding to the multiple areas by changing resolutions of some areas among the multiple divided areas, and a communication interface configured to transmit the multiple generated encoding data.

The processor may downscale the resolutions of the some areas.

The processor may determine an attribute of each of the multiple divided areas, and change the resolutions of the some areas on the basis of the determined attribute.

The processor may control the communication interface to transmit the multiple generated encoding data, and reference data including information about the determined attribute.

Meanwhile, the processor may compare a cost value of encoding data having a low resolution for each of the multiple divided images with a cost value of encoding data having a high resolution and determine whether each of the multiple divided areas has a dynamic attribute, and change a resolution with respect to an area determined to have a dynamic attribute.

The processor may generate the low-resolution encoding data by downscaling a resolution of a first area among the multiple divided areas and encoding the downscaled first area, generate the high-resolution encoding data by encoding the first area without a resolution change, generate a low-resolution divided image by decoding the low-resolution encoding data, generate a high-resolution divided image by decoding the high-resolution encoding data, calculate a cost of the low-resolution encoding data on the basis of a difference of pixel values between the first area and the low-resolution divided image and a size of the low-resolution encoding data and a size of the low-resolution encoding data, calculate a cost of the high-resolution encoding data on the basis of a difference of pixel values between the first area and the high-resolution divided image and a size of the high-resolution encoding data, and if the calculated cost of the low-resolution encoding data is less than a cost of the calculated cost of the high-resolution encoding data, determine that the first area has a dynamic attribute.

The processor may control the communication interface 110 to transmit, together with the multiple encoding data, information about a filter to be applied to some encoding data respectively corresponding to some areas having changed resolutions from among the multiple encoding data.

The processor may encode the filter information and transmit the encoded filter information.

In accordance with another aspect of the disclosure, a method for controlling a decoding apparatus is provided. The method includes receiving multiple encoding data respectively corresponding to multiple areas constituting one image, and reference data including attribute information of each of the multiple areas, generating multiple divided images by decoding the multiple encoding data, changing resolutions of some divided images among the multiple divided images on the basis of the received attribute information, and generating a reconstructed image by merging the some divided images having the changed resolutions and the remaining divided images.

The changing the resolutions may include upscaling the resolutions of the some divided images.

The method may further include receiving filter information. The generating the reconstructed image may include generating the reconstructed image by applying a filter corresponding to the received filter information to the some divided images and merging the some divided images to which the filter is applied and the remaining divided images.

The method may further include, based on the filter information being encoded in and receiving, decoding the encoded filter information.

The method may further include performing an image process for the generated reconstructed image.

The performing the image process may include performing at least one of deblocking filtering and adjustment of pixel values of a boundary between merged images.

The method may further include displaying the generated reconstructed image.

PREFERRED EMBODIMENTS FOR CARRYING OUT THE INVENTION

Hereinafter, the present invention will be described in detail with reference to the attached drawings.

Figure 1:
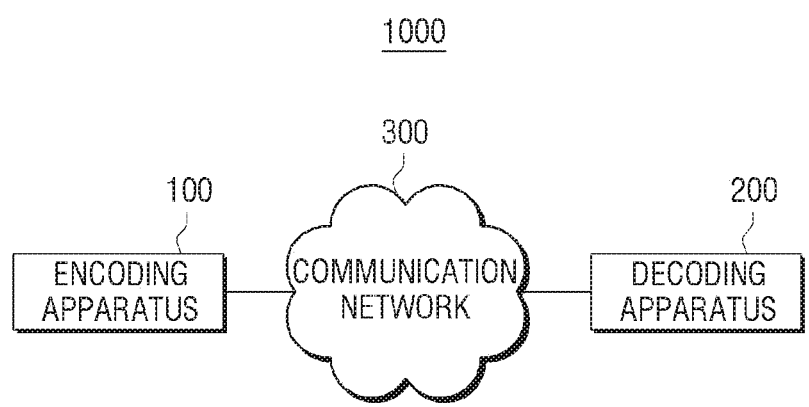
FIG. 1 is a diagram illustrating an image process system, according to an example embodiment.

FIG. 1 is a view illustrating an image process system 1000, according to an example embodiment. The image process system 1000 may include an encoding apparatus 100, a communication network 300, and a decoding apparatus 200.

The encoding apparatus 100 may be an apparatus which is capable of processing an image signal and transmit the processed image signal to an external apparatus. For example, the encoding apparatus 100 may include a broadcast server operated by a broadcasting station. Alternatively, the encoding apparatus 100 may include a server of an image content provider that provides image content of various countries, even if it is not a broadcasting station.

The decoding apparatus 200 may receive an image signal, and process an image signal in a manner suitable for each standard and provide an image to a user. For example, the decoding apparatus 200 may be an image display apparatus such as a television (TV), a smartphone, a tablet PC, a desktop computer and the like, or may be an apparatus which is capable of providing a processed image to an external apparatus, such as a set-top box.

The communication network 300 includes all of wire and wireless communication networks. Here, the wire communication network includes an Internet network such as a cable network or a Public Switched Telephone Network (PSTN), and the wireless communication network includes Code Division Multiple Access (CDMA), Wideband Code Division Multiple Access (WCDMA), Global System/Standard for Mobile Communication (GSM), Evolved Packet Core (EPC), Long Term Evolution (LTE), Wireless Broadband Internet (WiBro), or the like. For example, when the communication network 300 is a wired communication network, an access point may be connected to a switching center, etc., of a telephone station, but when the communication network 120 is a wireless communication network, it may be connected to an SGSN or a gateway GPRS support node (GGSN) to process data or connected to various relay stations such as base station transmission (BTS), NodeB, and e-NodeB to process data.

The encoding apparatus 100 may transmit an image signal to the decoding apparatus 200 via the communication network 300. In this case, the encoding apparatus 100 may transmit an image signal to the decoding apparatus 200 either directly or via an intermediate apparatus.

A general image compression technique is used in the encoding apparatus 100 and the decoding apparatus 200. For example, video compression technique such as H.264/AVC, HEVC, and MPEG2 is used.

According to various example embodiments, the encoding apparatus 100 may reduce a size of data transmitted when an image signal is transmitted, and the decoding apparatus 100 may provide a high-definition image. Hereinafter, the encoding apparatus 100 and the decoding apparatus 200 will be described in more detail with reference to the accompanying drawings.

Figure 2:
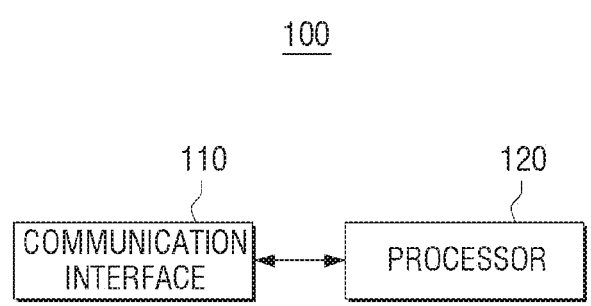
FIG. 2 is a block diagram provided to explain a configuration of an encoding apparatus, according to an example embodiment.

FIG. 2 is a block diagram provided explain a configuration of an encoding apparatus 100, according to an example embodiment. Referring to FIG. 2, the encoding apparatus 100 may include a communication interface 110 and a processor 120.

The communication interface 110 is a component for performing wireless or wired communication with a variety of external apparatuses. Specifically, the communication interface 110 may include an input/output (I/O) port for a wired connection to an external apparatus and various types of communication chips such as a Wi-Fi chip, a Bluetooth chip, a near-field communication (NFC) chip, a wireless communication chip, and the like for performing wireless communications.

The processor 120 is a component for controlling an overall operation of the encoding apparatus 100. The processor 120 may include a CPU, a RAM, a ROM, and a system bus. Here, the ROM is a component in which an instruction set for booting a system is stored, and the CPU copies an operating system (OS) stored in a storage of the encoding apparatus 100 to the RAM according to an instruction stored in the ROM, and executes the operating system (OS) to thereby boot the system. When the booting is completed, the CPU copies a variety of applications stored in the storage to the RAM, and executes the applications, thereby making it possible to perform a variety of operations. The processor 120 has been described above as including merely one CPU but may be implemented as multiple CPUs (or Digital Signal Processors (DSPs), System on Chips (SoCs), or the like).

The processor 120 may divide a pre-stored image into multiple areas, change resolutions of some of the multiple divided images, and generate multiple encoding data corresponding to each of the multiple areas.

Figure 3:
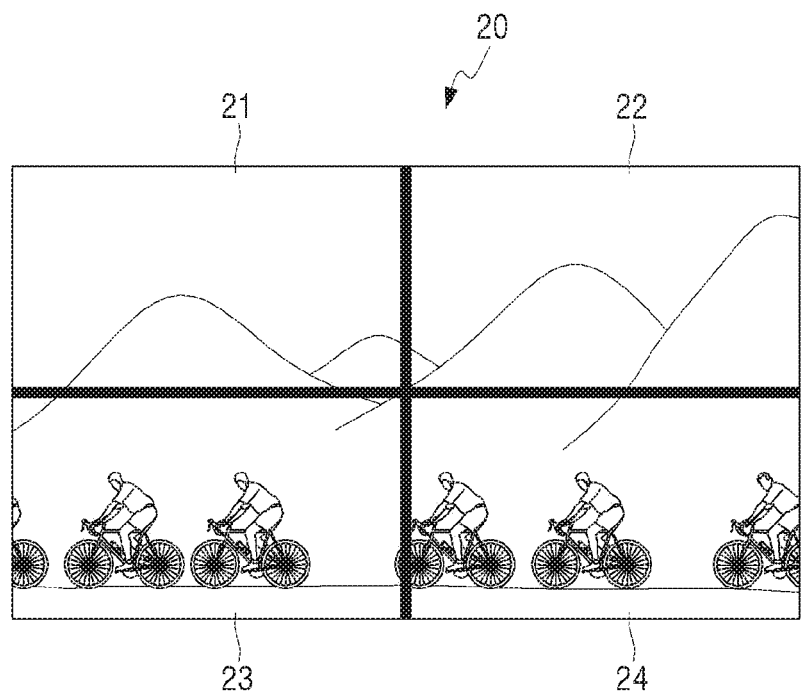
FIG. 3 is a diagram illustrating an image division which is performed in an encoding apparatus, according to an example embodiment.

In detail, the processor 120 may divide an image into a predetermined number of areas. For example, as illustrated in FIG. 3, one image 20 may be divided into four areas 21, 22, 23 and 24. Meanwhile, FIG. 3 is only an example, and the processor 120 may divide one image into five or more areas or less than four areas.

In addition, the processor 120 may change resolutions of some images among the multiple divided images. In this case, the processor 120 may determine an attribute of each of the multiple divided images, and determine an area of which a resolution is to be changed based on the determined attribute.

For example, the processor 120 may compare a cost value of encoding data having a low resolution for each of the multiple divided images with a cost value of encoding data having a high resolution and determine whether each of the multiple divided areas has a dynamic attribute, and perform downscaling of a resolution with respect to an area determined to have a dynamic attribute. In the disclosure, an image having a dynamic attribute is an image that needs downscaling, which may be called "a low-resolution (LR) image". An image not having a dynamic attribute is an image for which a high resolution of an original image is to be maintained, and thus may be differently referred to as "a high-resolution (HR) image". In addition, downscaling a resolution may be referred to as lowering a resolution or down sampling.

A cost value of a low-resolution encoding data and a high-resolution encoding data may be calculated according to the mathematical formula 1 shown below.

$$C = D + \lambda R \qquad \text{[Mathematical formula 1]}$$

where C is a rate-distortion cost, D is a parameter indicating a degree of distortion between an original image and a restored image, and R is a parameter indicating a size of encoded data. In addition, $\lambda$ is a lagrange multiplier, which may differ depending on the quantization parameter (QP).

First, the calculation of a cost of low-resolution encoding data using the mathematical formula 1 shown above will be described. In detail, to calculate a cost of low-resolution encoding data (i.e., the "C" in the mathematical formula 1 shown above) for any one area (hereinafter referred to as "first area") from among the multiple divided areas, the processor 120 may downscale a resolution of the first area by predetermined multiples, and encode the first area of which the resolution is downscaled and generate low-resolution encoding data. In the mathematical formula 1 shown above, the "R" may be the number of bits of the generated low-resolution encoding data.

The processor 120 may decode the generated low-resolution encoding data and generate a divided image having a low resolution. In this case, the processor 120 may decode low-resolution encoding data to correspond to previous downscaling by predetermined multiples, and then upscale the decoded data having the low resolution by predetermined multiples and generate a divided image having a low resolution.

The processor 120 may calculate a difference of pixel values of a pixel value of the original first area and a pixel value of the generated divided image having the low resolution. In the mathematical formula 1 shown above, the "D" is a difference value.

Similarly to the above, a cost of high-resolution encoding data for the first area may be obtained using the mathematical formula 1. In detail, to calculate a cost of high-resolution encoding data (i.e., the "C" of the mathematical formula 1 shown above) for the first area, the processor 120 may encode the first area without resolution adjustment and generate high-resolution encoding data. In the mathematical formula 1 shown above, the "R" may be the number of bits of the generated high-resolution encoding data.

The processor 120 may decode the generated high-resolution encoding data and generate a divided image having a high resolution.

The processor 120 may calculate a difference of pixel values of a pixel value of the original first area and a pixel value of the generated divided image having the high resolution. In the mathematical formula 1 shown above, the "D" may be this difference value.

If the calculated cost of the low-resolution encoding data is less than the calculated cost of the high-resolution encoding data, the processor 120 may determine that the first area is a dynamic attribute. That is, when it is assumed that the cost of the low-resolution encoding data is less than the cost of the high-resolution encoding data means that downscaling a resolution of the first area, and then encoding and transmitting the image is more advantageous than encoding and transmitting the image without changing the resolution in aspects of reduction of data to be transmitted and minimization of image distortion.

In contrast, if the calculated cost of the low-resolution encoding data is greater than the calculated cost of the high-resolution encoding data, the processor 120 may determine that the first area is not a dynamic attribute. That is, when it is assumed that the cost of the low-resolution encoding data is greater than the cost of the high-resolution encoding data means that decoding and transmitting the image without changing the resolution is more advantageous than downscaling a resolution of the first area, and then decoding and transmitting the image in aspects of reduction of data to be transmitted and minimization of image distortion.

The processor 120 may perform a process of obtaining two cost values as described above, for each of the multiple areas and determine whether each area has a dynamic attribute or not.

For the area determined to have a dynamic attribute, the processor 120 may downscale a resolution, and encode an area having the downscaled resolution and generate encoding data. In this case, the processor 120 may downscale the resolution by predetermined multiples (n). Here, the predetermined multiples (n) may be not only an integer but also a rational number.

Meanwhile, the processor 120 may downscale a resolution of each of the multiple areas determined to have a dynamic attribute by predetermined multiples. That is, different multiples may be applied for each of multiple areas determined to have a dynamic attribute. In this case, the processor 120 may calculate a cost by applying various multiples, and determine multiple of a minimum calculated cost as an optimum multiple.

For the area determined not to have a dynamic attribute, the processor 120 may perform encoding without resolution adjustment and generate encoding data.

As described above, the processor 120 may generate multiple encoding data corresponding to multiple divided areas respectively, and control the communication interface 110 to transmit the multiple generated encoding data to an external apparatus.

Meanwhile, the processor 120 may repeat the above-described process by dividing an image in various manners, and based on a cost of each case, determine how many areas the image should be divided to achieve an optimum result and how large a resolution should be downscaled to derive an optimum result. Accordingly, the processor 120 may divide an image into the determined optimum number of areas, and change resolutions of some areas to an optimum size of resolution, encode it and generate encoding data.

Figure 4:
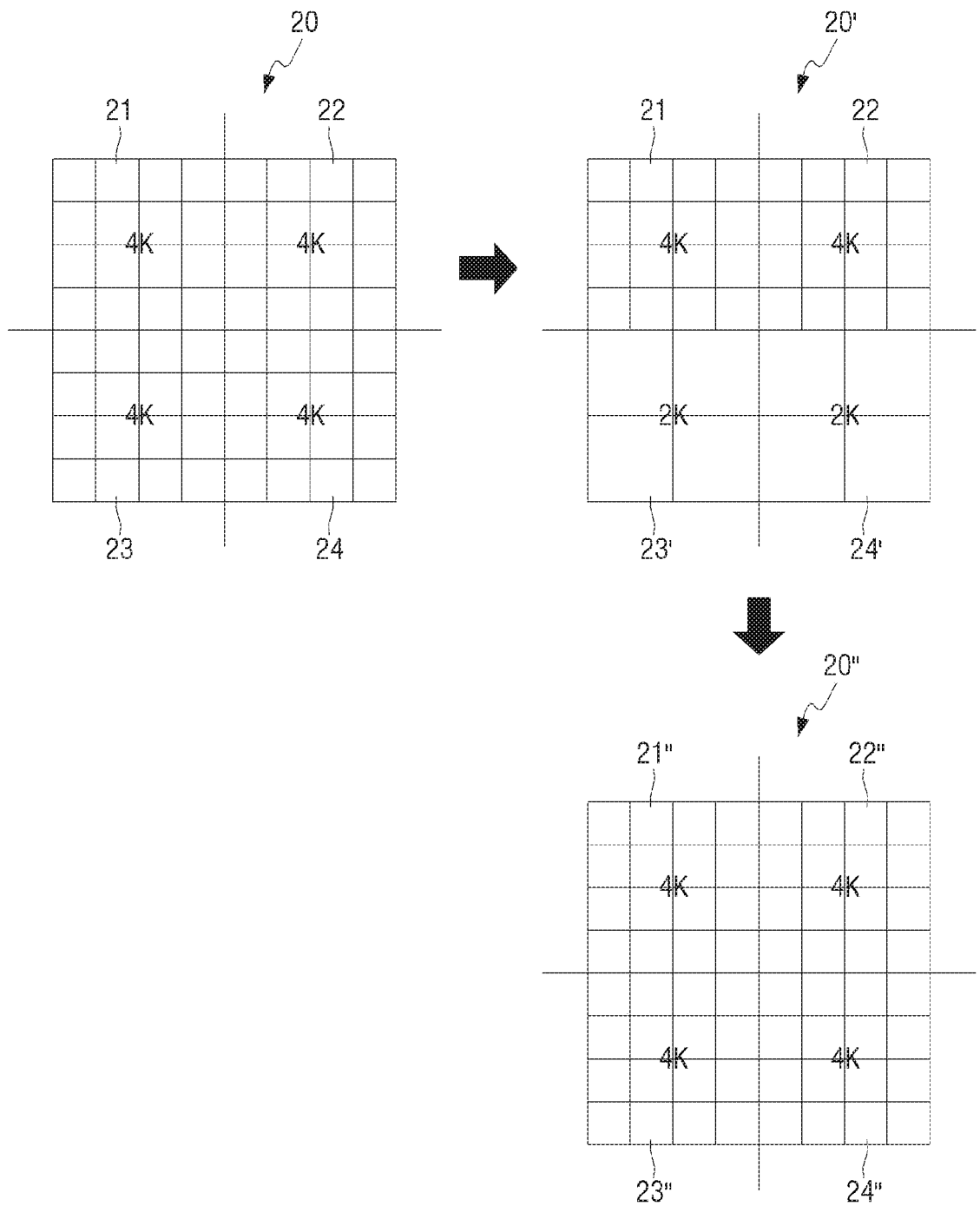
FIG. 4 is a block diagram provided to explain selective changing of a resolution for each of multiple areas, according to an example embodiment.

FIG. 4 illustrates a flow of processing of an image in an encoding apparatus 100, according to an example embodiment. In FIG. 4, the 4K indicates a resolution of 3,840×2,160, and the 2K indicates a resolution of 2,048×1,080. However, the number of pixels is reduced in FIG. 4 for the convenience of explanation.

The processor 120 may divide an original image 20 of 4K into multiple areas 21, 22, 23 and 24, and determine an attribute of each of the multiple areas. In FIG. 4, it is assumed that the areas 23 and 24 have a dynamic attribute.

The processor 120 may downscale the resolutions of the areas 23 and 24 determined to have a dynamic attribute to become areas 23' and 24', and may not adjust the resolutions of the areas 21 and 22.

In addition, the processor 120 may encode each of the areas 21, 22, 23' and 24' and generate multiple encoding data, and transmit the multiple generated encoding data.

The multiple encoding data may be decoded in the decoding apparatus 200 and a reconstructed image 20" is generated. In detail, the encoding data corresponding to the area 21 may be decoded and generated as a divided image 21". The encoding data corresponding to the area 22 may be decoded and generated as a divided image 22". The encoding data corresponding to the area 23' may be decoded and a resolution of the encoding data may be upscaled and the divided image 23" may be generated. The encoding data corresponding to the area 24' may be decoded and a resolution of the encoding data is upscaled and the divided image 24" may be generated. In addition, the divided images 21", 22", 23" and 24" are combined with each other and a reconstructed image 20" is generated. Meanwhile, an additional filtering process may be further performed for the divided images 23" and 24" having an upscaled resolution. An operation of the decoding apparatus 200 will be described in greater detail below with reference to FIG. 5.

Meanwhile, the processor 120 may control the communication interface 110 to transmit multiple encoding data respectively corresponding to multiple areas together with reference data including information relating to an attribute determined for each of the multiple areas. Thereby, the decoding apparatus 200 may be aware of whether which encoding data from among the multiple received encoding data an up sampling is to be applied. In addition, the information relating to the attribute may include information indicating the number of multiples is needed for the up sampling.

Meanwhile, the processor 120 may control the communication interface 110 to transmit, together with multiple encoding data, information relating to a filter to be applied to some encoding data respectively corresponding to some areas having changed resolutions from among multiple encoding data corresponding to multiple areas. That is, the processor 120 may generate and transmit information about a filter that the decoding apparatus 200 needs to reconstruct optimum image quality of a divided image having an upscaled resolution. In this case, the information about the filter may include a filter coefficient, and the filter coefficient may be defined as metadata and transmitted.

The filter coefficient may be calculated using the mathematical formula 2 shown below.

$$p_i = \mathrm{argmin} E\left[\left(Org - \left(\sum_{i=0}^{m} p_i Rec_i\right)\right)^2\right] \quad \text{[Mathematical formula 2]}$$

where the Org is an original sample, the Rec is a reconstructed sample, the p is a filter coefficient which is defined as metadata, and the m is a length of a filter coefficient.

In detail, the original sample refers to any one area from among the multiple divided areas. The reconstructed sample corresponds to an image generated by decoding encoding data generated by downscaling a resolution of the area by n multiples and encoding it and upscaling the resolution by n multiples again.

By using the mathematical formula 2 shown above, a filter coefficient that is capable of minimizing a difference between an original sample and a reconstructed sample may be determined. The determined filter coefficient may be transmitted together with the encoded data and used to reconstruct the image on the decoding apparatus 200 side.

According to another example embodiment, the processor 120 may encode the information about the filter and transmit the encoded information. In detail, a size and symbol of a filter coefficient may be encoded using a fixed length coding (FLC) technique. An FLC length may be calculated using the mathematical formula 3 shown below.

$$\mathrm{Max}(\mathrm{abs}(p_i)) < 2^{length} \quad \text{[Mathematical formula 3]}$$

where the length may be an FLC length, the abs may be a function for outputting an absolute value of a filter coefficient, and the Max may be a function for outputting a maximum value of a filter coefficient. In this case, it is possible to perform an FLC coding for a length value by using predefined bits, and to perform an FLC coding for filter coefficients by using bits of the number corresponding to the length. As described above, encoded information about a filter may be transmitted to the decoding apparatus 200. The decoding apparatus 200 may parse the received data of the number corresponding to a predetermined bit, and then determine a length value by decoding the length value. Thereafter, a filter coefficient value may be determined by parsing the number corresponding to the length and decoding a filter coefficient value.

Hereinafter, the decoding apparatus 200 will be explained with reference to FIG. 5.

Figure 5:
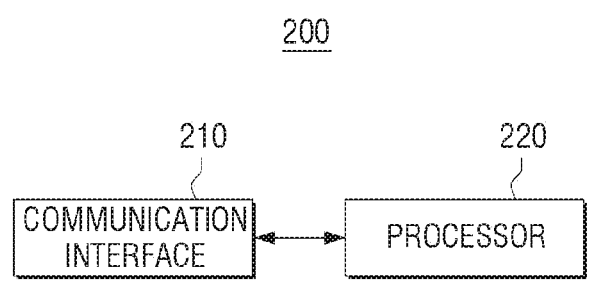
FIG. 5 is a block diagram provided to explain a configuration of a decoding apparatus, according to an example embodiment.

FIG. 5 is a block diagram provided explain a configuration of a decoding apparatus 200, according to an example embodiment. Referring to FIG. 5, the decoding apparatus 200 may include a communication interface 210 and a processor 220.

The communication interface 210 is a component for performing wireless or wired communication with a variety of external apparatuses. Specifically, the communication interface 210 may include an input/output (I/O) port for a wired connection to an external apparatus and various types of communication chips such as a Wi-Fi chip, a Bluetooth chip, a near-field communication (NFC) chip, a wireless communication chip, and the like for performing wireless communications.

The communication interface 210 may receive multiple encoding data respectively corresponding to multiple areas constituting one image and reference data including attribute information of each of the multiple areas.

The processor 220 is a component for controlling an overall operation of the decoding apparatus 200. The processor 220 may include a CPU, a RAM, a ROM, and a system bus. Here, the ROM is a component in which an instruction set for booting a system is stored, and the CPU copies an operating system (OS) stored in a storage of the decoding apparatus 200 to the RAM according to an instruction stored in the ROM, and executes the operating system (OS) to thereby boot the system. When the booting is completed, the CPU copies a variety of applications stored in the storage to the RAM, and executes the applications, thereby making it possible to perform a variety of operations. The processor 220 has been described above as including merely one CPU but may be implemented as multiple CPUs (or Digital Signal Processors (DSPs), System on Chips (SoCs), or the like).

The processor 220 may generate multiple divided images by decoding the multiple encoding data respectively, and change resolutions of some divided images among the multiple divided images on the basis of the attribute information included in the reference data received via the communication interface 210. In addition, the processor 220 may generate a reconstructed image by merging the some divided images having the changed resolutions and the remaining divided images.

In detail, the attribute information included in the reference data may include information about a result of dividing one image into multiple areas in the encoding apparatus 100 and determining whether each of the multiple areas has a dynamic attribute.

For a divided image generated by decoding encoding data corresponding to an area determined to have a dynamic attribute, the processor 220 may upscale a resolution. For a divided image generated by decoding encoding data corresponding to an area determined not to have a dynamic attribute, the processor 220 may not change a resolution.

In this case, the processor 220 may apply a filter to a divided image having an upscaled resolution by using filter information received together with the multiple encoding data and the attribute information. That is, referring to FIG. 3, a filter is applied to adjust image quality of the divided image having an upscaled resolution such as the areas 23" and 24" so that there is no difference between the image quality of the divided image and that of the original image.

When the information about the filter is encoded and received, the processor 220 may decode the received filter information. In detail, as previously described in relation to generating filter information in the encoding apparatus 100, the processor 220 may determine a length value by parsing data for a filter coefficient defined as metadata and received by the number corresponding to a predefined bit and then decoding the length value. Thereafter, a filter coefficient value may be determined by parsing the number corresponding to the length and decoding a filter coefficient value.

The processor 220 may filter a divided image having an upscaled resolution through the mathematical formula 4 shown below, using the decoded filter information, that is, a filter coefficient which is metadata.

$$Rec' = \left(\sum_{i=0}^{m} p_i Rec_i\right) \quad \text{[Mathematical formula 4]}$$

where the Rec is a divided image having an upscaled resolution, the pi is a filter coefficient which is defined as metadata, and the Rec' is a divided image generated by filtering a divided image having an upscaled resolution by using metadata.

The processor 220 may generate a reconstructed image by merging the divided image filtered as described above and the remaining divided images. In this case, an additional image process enabling the discontinuity occurring at a boundary between the divided images to be continuous may be further performed. In detail, for the reconstructed image, at least one image process from among deblocking filtering and adjusting a pixel value of a boundary between the merged divided images may be further performed.

The deblocking filtering may use a deblocking filter included in the H.264/AVC or HEVC technique. In addition, the adjustment of a pixel value of a boundary between the merged divided images may, if a difference of pixels in the vicinity of the boundary of the divided images is greater than or equal to a threshold value, include a process to adding an offset value to each pixel value.

Meanwhile, the decoding apparatus 200 may further include a display (not illustrated) displaying a reconstructed image which is generated. The display may be, for example, implemented as a liquid crystal display (LCD), a cathode-ray tube (CRT), a plasma display panel (PDP), an organic light emitting diode (OLED) display, a transparent OLED (TOLED) display, or the like. In addition, the display may be implemented as a touch screen type capable of sensing a touch manipulation of a user. In this case, the processor 220 may control the display to display the generated reconstructed image.

Meanwhile, the processor 220 may control the communication interface 210 to transmit a generated reconstructed image to an external apparatus so that the generated reconstructed image is displayed on the external apparatus.

Figure 6:
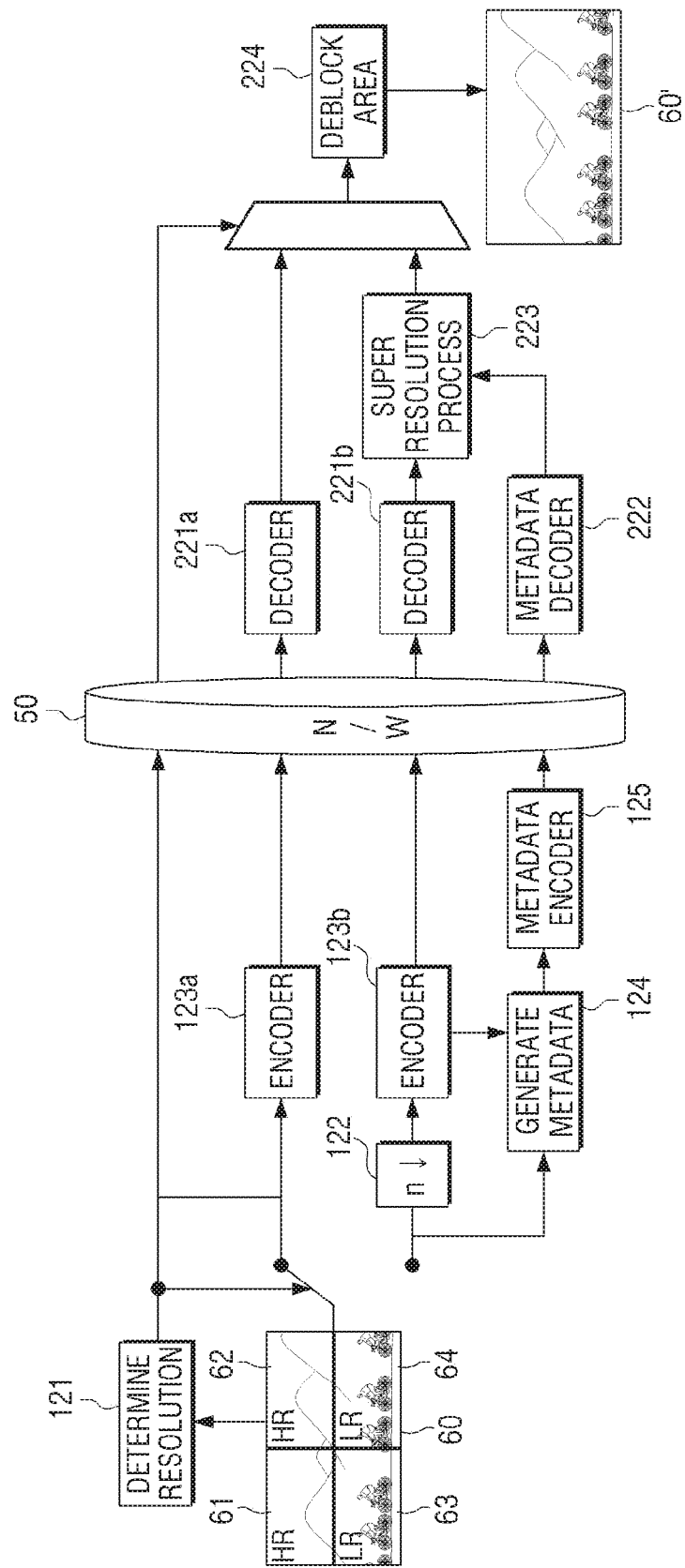
FIG. 6 is a diagram provided to explain an image process which is performed in an image process system, according to an example embodiment.

FIG. 6 is a diagram provided to explain a process of processing an image of an image process system 1000, according to an example embodiment.

Referring to FIG. 6, the encoding apparatus 100 may divide a pre-stored image 60 into multiple areas and determine whether to downscale a resolution of each of the multiple areas, at operation 121. This operation corresponds to a process of comparing a cost of high-resolution encoding data with a cost of low-resolution encoding data by using the mathematical formula 1 as described above.

In this case, the encoding apparatus 100 may divide the image 60 in various manners, and downscale each of the divided areas to a resolution of various sizes and calculate a cost. On the basis of the calculated cost, the encoding apparatus 100 may determine an optimum number of areas and an optimum size of resolution.

In FIG. 6, it is assumed that the image 60 is divided into four areas, that the two lower areas 63 and 64 are areas (LR) having resolutions to be downscaled by n multiples, and that the two areas 61 and 62 are areas (HR) having resolutions to be maintained at a high-resolution of an original image.

In addition, the encoding apparatus 100 may perform encoding 123a for the areas 61, 62 of which the resolutions are maintained and generate encoding data.

In addition, the encoding apparatus 100 may, on the basis of the determination result, downscale 122 the resolutions of the areas 63 and 64 by n multiples, and perform encoding 123b for the downscaled areas 63 and 64 and generate encoding data.

In addition, the encoding apparatus 100 may generate metadata, at operation 124. The generation of metadata will be described in greater detail with reference to FIG. 7.

Figure 7:
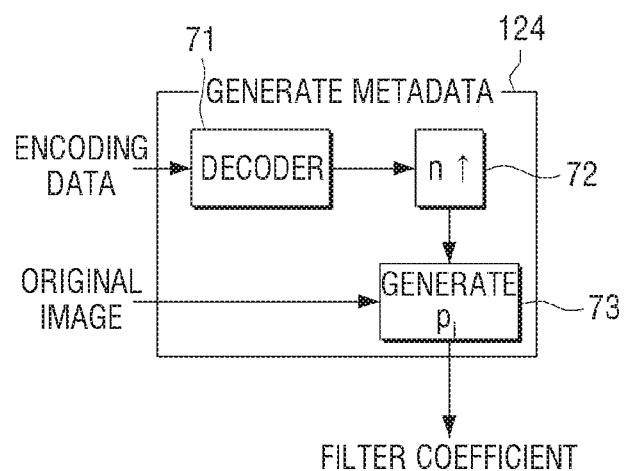
FIG. 7 is a block diagram provided to explain generation of metadata in an encoding apparatus, according to an example embodiment.

Referring to FIG. 7, at operation of generating the metadata (124), the encoding apparatus 100 may perform encoding 123b for the area 63 of which a resolution is downscaled by n multiples and decode the generated encoding data (71), and perform upscaling (7) to a resolution of the generated decoded image data by n multiples. In addition, the encoding apparatus 100 may calculate a filter coefficient 73 which minimizes a difference between pixel values of the image upscaled by n multiples and the area 63 which is an original image. A filter coefficient may be calculated as in the mathematical formula 2 described above. In addition, the encoding apparatus 100 may perform the same process for the area 64 of which a resolution is downscaled by n multiples and calculate a filter coefficient corresponding to the area 64. In addition, the calculated filter coefficients may be defined as metadata.

Referring back to FIG. 6, the encoding apparatus 100 may encode metadata, at operation 125.

In addition, the encoding apparatus 100 may transmit, to the network 50, information (4 areas) about the number of areas generated from dividing the image and information about an attribute of each of the areas (information indicating that a resolution change is not necessary for encoding data corresponding to the areas 61 and 62, and that a resolution upscaling by n multiples is necessary for encoding data corresponding to the areas 63 and 6r). In addition, the encoding apparatus 100 may transmit, to the network 50, multiple encoding data respectively corresponding to the areas 61 and 62 of which resolutions are not changed and multiple encoding data respectively corresponding to the areas 63 and 64 having the changed resolutions. In addition, the encoding apparatus 100 may transmit encoded metadata to the network 50.

The decoding apparatus 200 may receive the data as described above.

The decoding apparatus 200 may parse and decode the received information about the number of areas. In addition, the decoding apparatus 200 may parse and decode the multiple received encoding data and generate multiple divided images, at operations 221a and 221b.

In addition, the decoding apparatus 200 may parse and decode a flag indicating whether a divided image is an LR image (an image of which a resolution needs to be upscaled by n multiples) or an HR image (an image for which a resolution change is not necessary). When it is determined that the divided image is an LR image, the decoding apparatus 200 may parse and decode (222) metadata, upscale a resolution of the divided image by n multiples, and perform a super resolution process (223) which applies a filter coefficient which is metadata to the divided image having a resolution upscaled by n multiples. This process is repeatedly performed for the number of interpreted areas. The process corresponds to the code as shown below.

```
Parsing Process at Decoder
StreamSR( )
{
    Number_Of_Area
    for (x=0; x<Number_Of_Area;x+ +)
    {
        VideoCompressedData
        LR_Flag
        if (LR_Flag)
        {
            Metadata
        }
    }
}
```

The decoding apparatus 200 may generate a reconstructed image 60' by merging final divided images (that is, multiple divided images generated by decoding (221a) multiple encoding data respectively corresponding to the areas 61 and 62 and multiple divided images generated by decoding (221b) multiple encoding data respectively corresponding to the areas 63 and 64, upscaling resolutions, then applying a filter, and performing a super resolution process (223), and performing a region deblocking process.

According to the example embodiment described above, some areas from among multiple areas in the image is downsampled and encoded and thus, a size of data to be transmitted may be reduced. In addition, the some areas are selectively downsampled in consideration of an attribute of each of the multiple areas and thus, image quality of a reconstructed image is superior as compared with a case where a downsampling is performed for all areas. Since a scene included in an image becomes larger as the image has a higher resolution, there are many scenes having various properties and thus, the present disclosure is appropriate when a high-resolution image is transmitted. In particular, it is appropriate to apply an image process according to an example embodiment for an effective ultra-high-definition (UHD) service for over-the-top (OTT).

Figure 8:
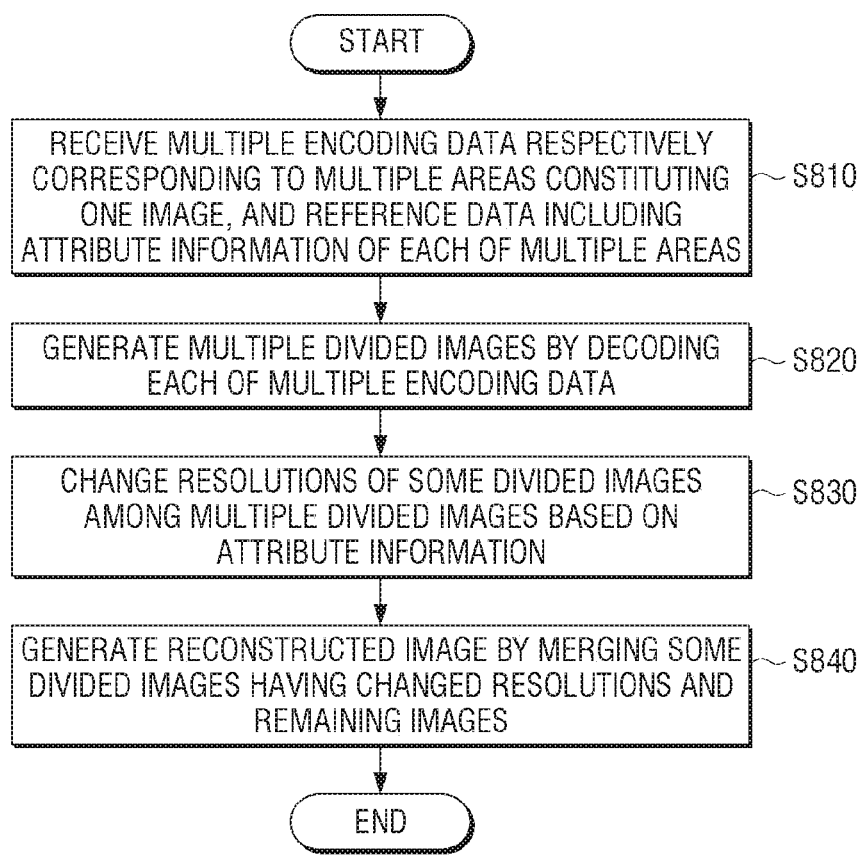
FIG. 8 is a flowchart provided to explain a method for controlling a decoding apparatus, according to an example embodiment.

FIG. 8 is a diagram provided to explain a method for controlling a decoding apparatus, according to an example embodiment.

The decoding apparatus 200 may receive multiple encoding data respectively corresponding to multiple areas constituting one image, and reference data including attribute information of each of the multiple areas, at operation S810.

In this case, the reference data may further include information about the number of the multiple areas and information about a filter to be applied to some encoding data.

In addition, the decoding apparatus 200 may decode each of the multiple encoding data and generate multiple divided images, at operation S820.

In addition, the decoding apparatus 200 may change resolutions of some divided images from among the multiple divided images on the basis of the received attribute information, at operation S830.

In detail, the decoding apparatus 200 may determine whether each of the multiple divided images is an LR image or an HR image on the basis of the received attribute information. The LR image is a divided image which is generated by decoding data encoded after its resolution is downscaled in the encoding apparatus 100, and the HR image is a divided image which is generated by decoding, in the decoding apparatus 200, data encoded without a resolution change in the encoding apparatus. The LR image may be referred to as an image having a dynamic attribute, and the HR image may be differently referred to as an image not having a dynamic attribute.

The decoding apparatus 200 changes a resolution of only a divided image determined to be an LR image. In detail, when it is determined that a divided image is an LR image, a resolution of the LR image is upscaled.

In addition, the decoding apparatus 200 may generate a reconstructed image by merging the some divided images having the changed resolutions and the remaining divided images, at operation S840.

In this case, for the divided images having the changed resolutions, the decoding apparatus 200 may improve image quality by applying a filter corresponding the received filter information, and generate a reconstructed image by merging the some divided images of improved quality and the remaining divided images.

Figure 9:
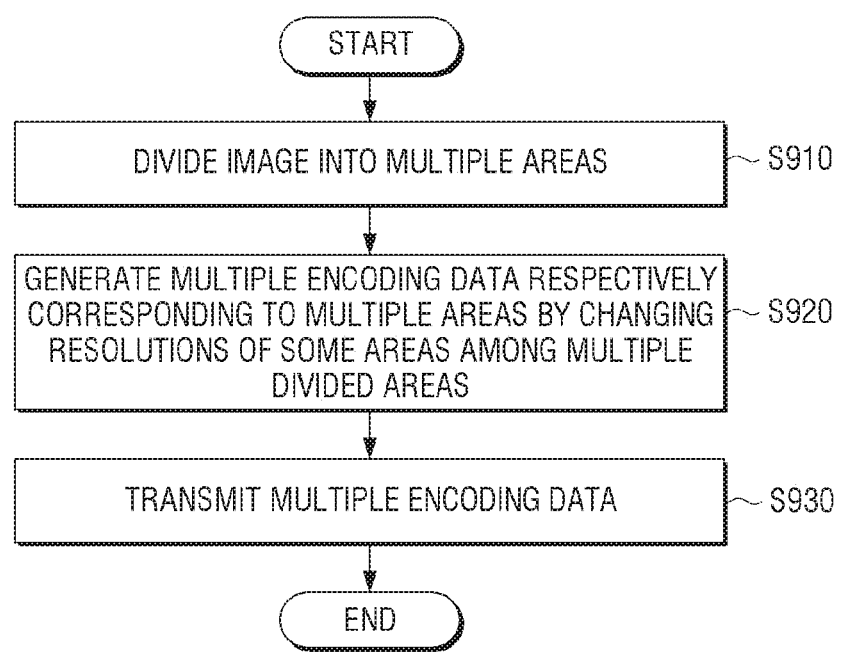
FIG. 9 is a flowchart illustrating a method of controlling an encoding apparatus, according to an example embodiment.

FIG. 9 is a flowchart illustrating a method of controlling an encoding apparatus, according to an example embodiment.

The encoding apparatus 100 may divide an image into multiple areas, at operation S910.

In addition, the encoding apparatus 100 may change resolutions of some areas of the multiple divided images and generate multiple encoding data respectively corresponding to the multiple areas, at operation S920.

In detail, the encoding apparatus 100 may determine an attribute of each of the multiple divided areas, and for an area determined not to have a dynamic attribute, perform encoding with the corresponding original area as an input value of an encoder and generate encoding data. In addition, for an area determined to have a dynamic attribute, the encoding apparatus may downsample a resolution of the corresponding original area by a size of n, and then perform encoding with the original area as an input value of an encoder and generate encoding data.

In addition, the encoding apparatus 100 may generate a filter coefficient by receiving encoding data corresponding to an area having a downsampled resolution and an original image of the corresponding area as input values, and the generated filter coefficient may be compressed in a metadata encoder.

In addition, the encoding apparatus 100 may transmit the multiple generated encoding data, at operation S930. In this case, the information about the number of the multiple divided areas, attribute information and information about a filter coefficient may be transmitted together with the multiple encoding data.

Various example embodiments described above may be embodied in a recording medium that may be read by a computer or a similar apparatus to the computer by using software, hardware, or a combination thereof. According to the hardware embodiment, exemplary embodiments that are described in the present disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In some cases, embodiments described herein may be implemented by processor 110 and 210 itself. According to a software implementation, embodiments such as the procedures and functions described herein may be implemented with separate software modules. Each of the software modules may perform one or more of the functions and operations described herein.

Methods of controlling an encoding apparatus and a decoding apparatus according to various example embodiments may be stored on a non-transitory readable medium. The non-transitory readable medium may be installed in various devices.

The non-transitory computer readable medium refers to a medium that stores data semi-permanently rather than storing data for a very short time, such as a register, a cache, a memory or etc., and is readable by an apparatus. In detail, programs for executing the aforementioned various methods may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

The invention claimed is:

1. A decoding apparatus, comprising:
a communication interface configured to:
receive a plurality of encoding data respectively corresponding to a plurality of areas constituting an image,
receive reference data including attribute information of each of the plurality of areas, and
receive filter information; and
a processor configured to:
generate a plurality of divided images from the image by decoding the plurality of encoding data,
determine whether to change resolutions of at least one divided image among the plurality of divided images based on the attribute information,
change resolutions of the at least one divided image based on the determination result, and
generate a reconstructed image by applying a filter corresponding to the filter information to the at least one divided image having the changed resolutions and merging the at least one divided image to which the filter is applied with remaining divided images.

2. The decoding apparatus of claim 1, wherein the processor is further configured to upscale the resolutions of the at least one divided image.

3. The decoding apparatus of claim 1, wherein the processor is further configured to, based on the filter information being encoded and received, decode the encoded filter information.

4. The decoding apparatus of claim 1, wherein the processor is further configured to perform an image process for the reconstructed image.

5. The decoding apparatus of claim 4, wherein the image process comprises at least one of deblocking filtering or adjustment of pixel values of a boundary between merged images.

6. The decoding apparatus of claim 1, further comprising a display configured to display the reconstructed image.

7. The decoding apparatus of claim 1, wherein the processor is further configured to control the communication interface to transmit the reconstructed image to an external apparatus.

8. A method for controlling a decoding apparatus, the method comprising:
- receiving a plurality of encoding data respectively corresponding to a plurality of areas constituting one image;
- receiving reference data including attribute information of each of the plurality of areas;
- receiving filter information;
- generating a plurality of divided images by decoding the plurality of encoding data;
- determining whether to change resolutions of at least one divided image among the plurality of divided images based on the received attribute information;
- changing resolutions of the at least one divided image based on the determination result; and
- generating a reconstructed image by applying a filter corresponding to the filter information to the at least one divided image having the changed resolutions and merging the at least one divided image to which the filter is applied with remaining divided images.

9. The method of claim 8, wherein the changing of the resolutions comprises upscaling the resolutions of the at least one divided image.

10. The method of claim 8, further comprising, based on the filter information being encoded and received, decoding the encoded filter information.

11. The method of claim 8, further comprising performing an image process for the reconstructed image.

12. The method of claim 11, wherein the performing of the image process comprises performing at least one of deblocking filtering or adjustment of pixel values of a boundary between merged images.

13. The method of claim 8, further comprising displaying the reconstructed image.

* * * * *